W. PETSCHEL.
BATTERY.
APPLICATION FILED FEB. 27, 1911.
1,045,880.
Patented Dec. 3, 1912.
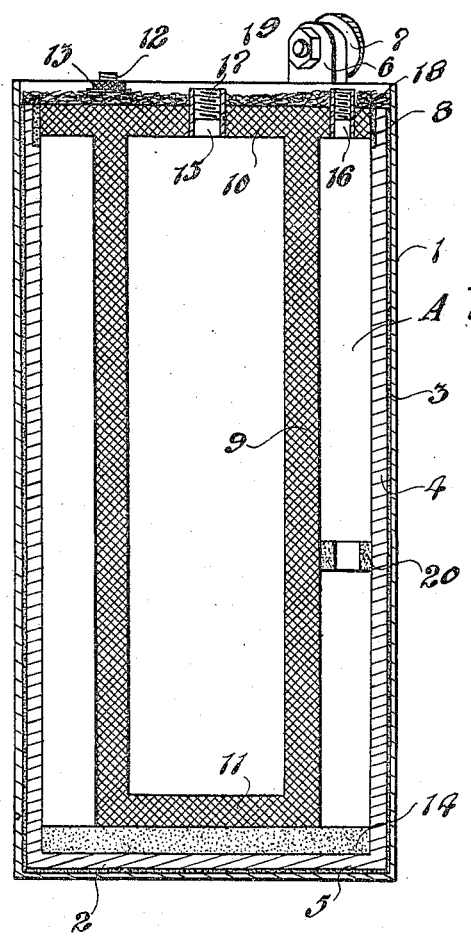
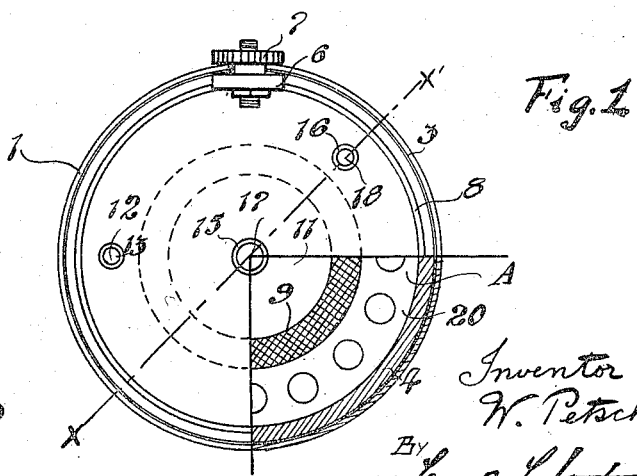

UNITED STATES PATENT OFFICE.

WILLIAM PETSCHEL, OF WINNIPEG, MANITOBA, CANADA.

BATTERY.

1,045,880.

Specification of Letters Patent. Patented Dec. 3, 1912.

Application filed February 27, 1911. Serial No. 611,045.

*To all whom it may concern:*

Be it known that I, WILLIAM PETSCHEL, of the city of Winnipeg, in the Province of Manitoba, Canada, have invented certain new and useful Improvements in Batteries, of which the following is the specification.

My invention relates to primary batteries, and the object of the invention is to provide a simply constructed, efficient and durable battery of this kind which, although sealed, can be recharged when the electrolytes become weak, and it consists essentially in an outer casing or cylindrical box, an inner cylindrical zinc electrode insulated from the box, the electrode being fitted with a suitable terminal, a cylindrical carbon electrode supported above the bottom of the zinc electrode and supplied with a permanently closed top extending toward the zinc electrode, removable plugs carried by the top aforesaid, spacing pieces between the carbon and the zinc electrodes, and means permanently inclosing the electrodes within the casing, the parts being arranged and constructed as hereinafter more particularly described.

Figure 1 is a plan view of the battery, a part being shown in horizontal section, and the sealing compound being removed. Fig. 2 is a longitudinal view centrally through the same, the section being taken in the plane denoted by the line X X', Fig. 1.

In the drawing like characters of reference indicate corresponding parts in each figure.

1 represents a cylindrical casing or box having a closed bottom 2 and open top within which casing and bottom is inserted an insulating material 3 formed from fiber or paper.

4 represents the positive or zinc electrode which is cylindrical in form and is provided with a closed bottom 5 and fits snugly within the paper insulator. The zinc electrode is supplied with a terminal 6 or binding post carrying a thumb nut 7 and a ring of insulated material 8 at its upper end, which ring insulates the carbon, later referred to, from it.

9 is the negative or carbon electrode which is cylindrical in form and has a closed top 10 and bottom 11 the top being enlarged so as to extend outwardly to the insulator 8 when said electrode is inserted within the zinc electrode.

12 represents the positive terminal which is supplied with a thumb nut 13.

14 is a fiber or insulating disk inserted between the bottom of the carbon and zinc electrodes.

15 and 16 are interiorly threaded ferrules passing through the top of the carbon electrode, and fitted with removable plugs 17 and 18, respectively. The ferrules extend beyond the top of the electrode so as to be clear of the cement or composition 19 which seals over the top of the battery and retains the parts permanently within the casing.

20 is a perforated insulating ring located between the carbon and zinc electrodes and held in position by frictional contact with the aforesaid parts.

It is to be noticed that the plug 17 is located so that the depolarizer such as nitric acid can be placed within the carbon electrode while the plug 18 allows the negative electrolyte to be placed within the chamber A located between the negative and the positive electrodes, it being understood that the plugs are kept clear of the sealing compound so that they can be removed at any time.

What I claim as my invention is:

The combination comprising a cylindrical casing having a closed bottom, a hollow cylindrical zinc electrode contained within the casing and insulated therefrom, said electrode having a closed bottom and open top, a hollow cylindrical carbon electrode within the zinc electrode having a closed top and bottom, said top extending toward the carbon electrode and being constructed so as to reserve a chamber between the carbon and the zinc electrodes, an insulated disk inserted between the bottoms of the said electrodes, an insulated ring inserted between the top of the carbon electrode and the adjoining face of the zinc electrode, a perforated ring within the chamber aforesaid spacing the electrodes, terminals extending from the electrodes, a compound permanently inclosing the electrodes within the casing, and removable screw plugs carried by the top of the carbon electrode allowing respectively of entrance to the chamber aforesaid and to the interior of the carbon electrode, as and for the purpose specified.

Signed at Winnipeg, in the Province of Manitoba, this 30th day of January, 1911.

WILLIAM PETSCHEL.

In the presence of—
G. S. ROXBURGH,
J. K. ELKIN.

Copies of this patent may be obtained for five cents each, by addressing the "Commissioner of Patents, Washington, D. C."